United States Patent [19]

Nagamachi

[11] Patent Number: 5,235,467
[45] Date of Patent: Aug. 10, 1993

[54] CYLINDRICAL LENS AND A MANUFACTURING METHOD FOR THE SAME

[75] Inventor: Koichi Nagamachi, Ikeda, Japan

[73] Assignee: Zeni Lite Buoy Co., Limited, Osaka, Japan

[21] Appl. No.: 790,004

[22] Filed: Nov. 4, 1991

Related U.S. Application Data

[63] Continuation of Ser. No. 498,013, Mar. 23, 1990, abandoned.

[51] Int. Cl.$^5$ ............................................. G02B 3/08
[52] U.S. Cl. ................................. 359/742; 359/710
[58] Field of Search ............... 350/452, 409, 417, 433, 350/442, 443, 451, 452; 359/743, 742, 710; 367/3

[56] References Cited

U.S. PATENT DOCUMENTS

| | | | |
|---|---|---|---|
| 2,097,850 | 11/1937 | Wallace | 359/743 |
| 4,385,808 | 5/1983 | Vanderwerf | 350/452 |
| 4,456,344 | 6/1984 | Bordingnon | 359/742 |
| 4,545,366 | 10/1985 | O'Neill | 350/452 |
| 4,657,355 | 4/1987 | Negishi | 350/452 |
| 4,906,070 | 3/1990 | Cobb | 350/286 |
| 5,016,227 | 5/1991 | Turner, Jr. | 367/3 |

Primary Examiner—Bruce Y. Arnold
Assistant Examiner—James Phan
Attorney, Agent, or Firm—Koda and Androlia

[57] ABSTRACT

A lens in a shape of cylinder or head-cut-off cone made of transparent thin film materials with a fine prism-shaped fresnel lens surface formed thereon. The cylindrical lens is manufactured by forming a fine prism-shaped linear fresnel lens surface on a thin transparent film, shaping the film into a cylinder or a frustum of a cone, and connecting both ends of the film so that the fresnel center line forms a horizontal ring.

1 Claim, 3 Drawing Sheets

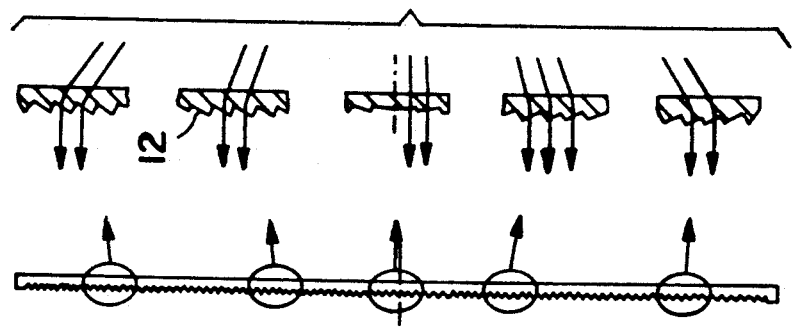
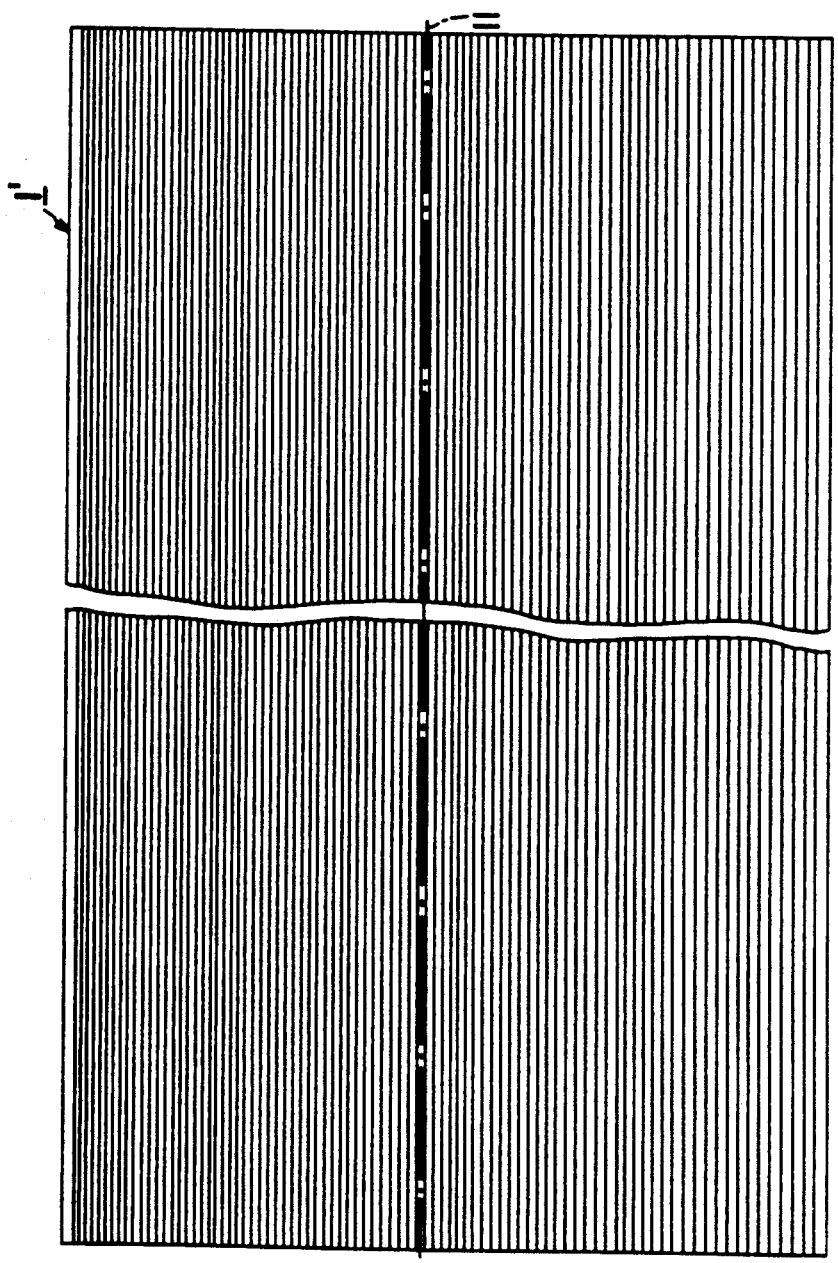

CYLINDRICAL LENS AND A MANUFACTURING METHOD FOR THE SAME

This is a continuation of application Ser. No. 498,013, filed Mar. 23, 1990, now abandoned.

BACKGROUND OF THE INVENTION

1. Field of the Invention

The present invention relates to an improvement in a cylindrical lens for a beacon that converges beams of light onto a horizontal surface.

2. Prior Art

A cylindrical lens has been widely used for lighting waterways, etc. With a light source in the center, the cylindrical lens is designed so that it has a focal point in the center. Light emitted from the light source passes through the lens and converges on parallel beams of light at the height of the lens.

Unlike the photographic lens or magnifying lens, resolution or distorted aberrations are not a problem for the cylindrical lens used for this purpose, which is only concerned with the convergence efficiency of light-emission energy.

In order to increase the luminous intensity, the numerical aperture of the lens can be increased, but the diameter of the lens is determined by the focal distance, and in order to increase the numerical aperture, the lens height must be raised. However, the incidence angle from the light source to the lens is limited to a maximum of $\pm 60°$ to $65°$. In addition, in order to reduce loss of light passing through the lens, the lens must be thin. In view of these conditions, a fresnel-lens-type cylindrical lens is used. FIG. 4 shows a schematic view of such lens.

So as to design the cylindrical fresnel lens to be thin, the lens includes a main lens part and a multi-layered annular part provided above and below the main lens part, and the light-emitting plane of which correspond to the lens surface and consists of a curved plane requiring precision in forming.

Currently, cast glass has been used as a material for the cylindrical fresnel lens for waterway beacon lighting equipment. However, because of various reasons such as mold precision, casting, mold releasing and cooling process, it is impossible to manufacture a high performance lens.

Recently, high performance cast cylindrical lenses are produced by the use of a plastic injection molding method so as to secure a proper thickness of the cylindrical lens. Either way, molds for the casting require a high precision and are expensive. In the case of plastic lens, a certain volume has to be continuously provided in order to stabilize the quality, thereby resulting in high manufacturing cost.

Demand for waterway beacon lenses is small compared to general commodities. The combination of special attributes of the lens, expensive mold, limited production volume and severe performance requirements have made development of a new lens for a demanded purpose very difficult.

The thinner the lens, the less light is lost through the lens. Therefore, the smaller the pitch between the rings of the fresnel lens, the thinner the lens can be made. Recent improvement in machining precision of molds and progress in plastic materials made a pitch of 0.1 mm possible. Also, if the pitch is made small, sufficient precision can be obtained even if the vertical section of the light-emitting plane is processed linearly, i.e., in a prism shape, instead of a curved line, which makes machining of a mold very easy.

SUMMARY OF THE INVENTION

Accordingly, it is a main object of the present invention to provide a cylindrical lens made of a thin cylinder or thin frustum of a cone which forms a fine prism-shape fresnel plane. Instead of plastic injection molding, the method of the present invention uses a mold for a small-pitch thin linear lens which is a plane development of a cylindrical fresnel lens, and a thin flexible plastic plate is heated and pressed to make a thin-plate-shaped linear lens, which is rolled so that the fresnel center line forms a horizontal ring, thereby forming a cylindrical lens made of a cylinder or frustum of a cone.

A flat metal plate for the mold is machined by a milling machine or a thin metal plate for the mold is wound around the circumference of the cylinder for machining with a lathe to make a fresnel plane, which is taken off and spread into a flat plate, and then heated and pressed onto a flexible transparent resin film to form a fine prism-shaped linear fresnel plane. If the thin metal plate for the mold is wound around the frustum of a cone and machined by lathe and spread into a flat plate, it becomes a flat mold for a cylindrical lens of a frustum of a cone.

Because a fine prism-shaped fresnel lens is used for a cylindrical fresnel lens, the emitting plane can have a linear vertical section, making the lens design easy. Molds can be easily machined by numerically controlled milling machines or lathes; therefore, thin flexible linear lenses can be easily formed, which are bent to make thin cylindrical fresnel lenses.

As described above, the thin cylindrical lens facilitates a mold manufacturing and lens formation, making it economical and easy to produce a new lens with a high transmission factor.

BRIEF DESCRIPTION OF THE DRAWINGS

FIG. 2(a) is a plan view of the linear lens;

FIG. 2(b) is a side view thereof;

FIG. 2(c) is an enlarged partial view of the sections marked with arrows in FIG. 2(b);

DETAILED DESCRIPTION OF THE INVENTION

Figure 1:
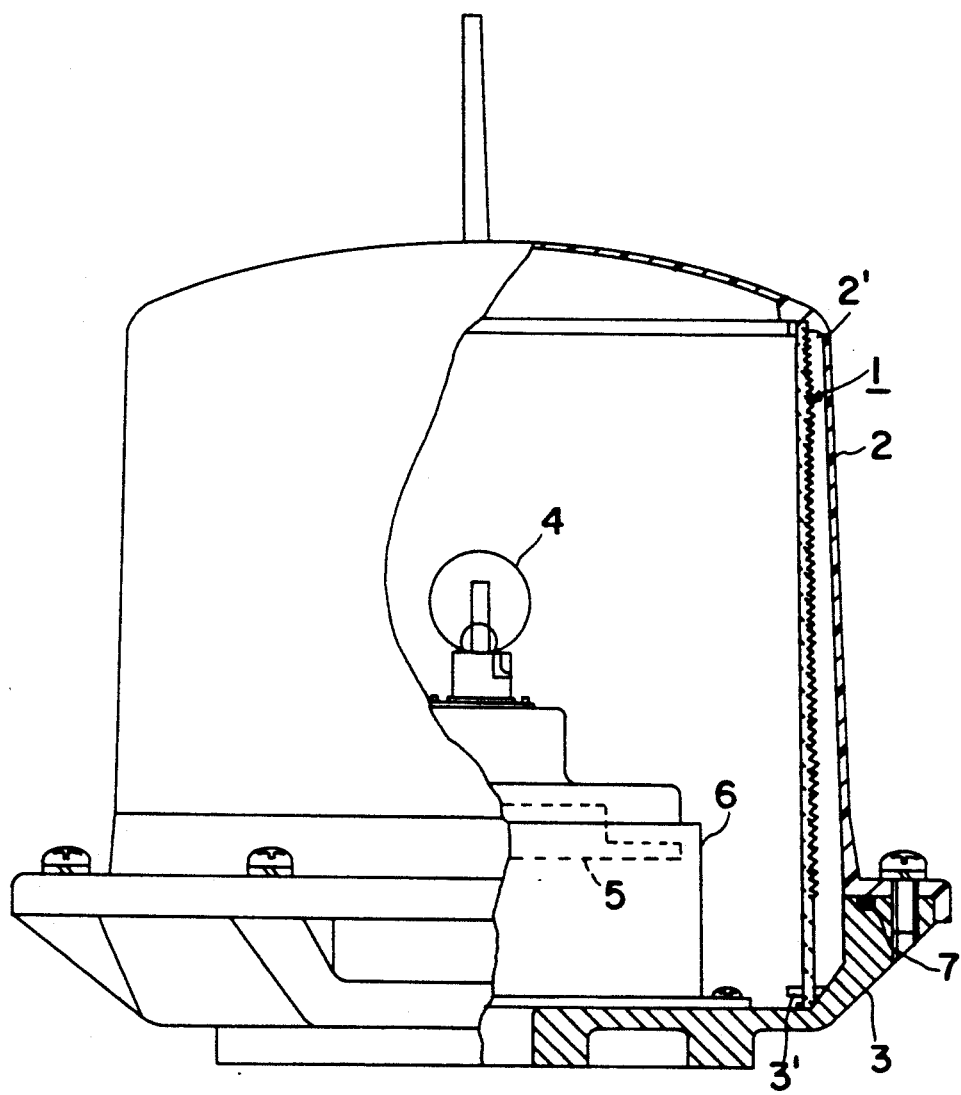
FIG. 1 is a partially cut-off front view of the lighting equipment for beacon equipped with a cylindrical lens of the present invention.

FIG. 1. is a partial front view of a beacon lighting equipment using a cylindrical lens of the present invention, in which reference numeral 1 is a cylindrical lens, 2 is a cover and 3 is a cast flange. A lighting equipment 6 provided on the cast flange supports a bulb 4 and incorporates a flashing circuit 5. The cover 2 and the flange 3 are respectively provided with supporting pieces 2' and 3' that support the cylindrical lens 1. Reference numeral 7 is a seal to keep the device watertight. The flange 3 is linked to the beacon body that holds a power source battery. Beams of light emitted from the bulb 4 are converged to non-directional horizontal beams of light by passing through the cylindrical lens 1 which is very thin, thus reducing transmission loss to a minimum.

FIG. 2(a) is plan view of a linear fresnel lens 1' made of a fine prism-shaped linear fresnel lens surface formed on the transparent resin film of a flexible thin plate, FIG. 2(b) is a side view thereof, and FIG. 2(c) is the an enlarged partial view thereof. The arrows in FIG. 2(c) show the convergence (or path) of horizontal beams of light after passing through the lens 1. Reference numeral 11 is a fresnel center line, and 12 is a linear light-emitting surface of the lens.

Figure 3A:
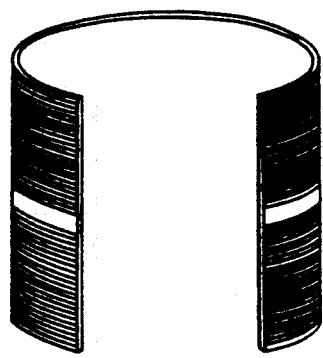
FIG. 3(a) shows the process of rolling thin plate linear fresnel lenses into a cylinder.
Figure 3B:
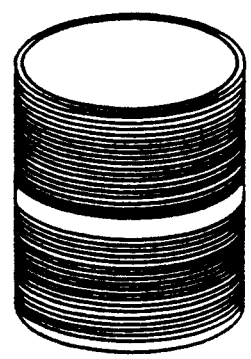
FIG. 3(b) is a perspective view of a completely rolled cylinder.
Figure 4:
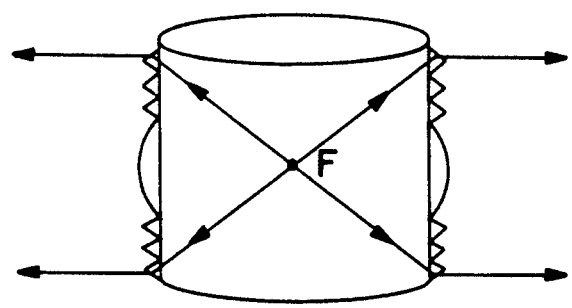
FIG. 4 is a schematic view of a conventional fresnel lens.

FIG. 3(a) shows a process of rolling the linear fresnel lens 1' in which the fresnel center line forms a horizontal ring, and FIG. 3(b) is a perspective view of the cylindrical lens which is made by completely rolling the liner fresnel and matching the edges.

This manufacturing method allows the fresnel surface to be easily formed on either the outer or inner surface of the cylindrical lens, through formation on the inner surface requires a different lens design. With a conventional cylindrical lens, direct formation of a fresnel surface on the inside of the cover was impossible because it was difficult to remove the mold. However, by the method described above, a cylindrical lens with an inner fresnel lens can be easily produced by adhering a fresnel surface onto the inside of the lens cover or to a transparent cylinder. Also, by supporting the fresnel inside the cover as shown in FIG. 1, no force is applied to the lens; therefore, the lens can be made as thin as possible, resulting in a high-transmission factor.

In the above embodiment, the focus of the lens is in the center of the cylindrical lens, but when using an annular light source, e.g., a ring-shaped fluorescent light is used, a cylindrical lens with an annular focal point is necessary. In this case, the roll diameter can simply be made larger.

The present invention provides a cylindrical lens which is much thinner, easier to produce, more economical and has a higher light transmission factor than conventional cylindrical lenses made by injection molding using an expensive metal mold. Accordingly, cylindrical lenses suitable for many novel and different applications can be provided.

I claim:

1. A method for manufacturing a cylindrical converging lens comprising the steps of forming a prism-shaped linear Fresnel lens surface on one surface of a transparent film and rolling said film on a support means comprising a transparent cylinder into a cylinder with said prism-shaped linear Fresnel lens surface provided on one surface of said cylinder so that a Fresnel centerline forms a horizontal ring.

* * * * *